United States Patent
Krogmann et al.

(10) Patent No.: US 7,400,347 B2
(45) Date of Patent: Jul. 15, 2008

(54) CAMERA SYSTEM FOR MONITORING A SOLID ANGLE REGION AND FOR DETECTION OF DETAILED INFORMATION FROM THE SOLID ANGLE REGION

(75) Inventors: Dirk Krogmann, Überlingen (DE); Kai Moldenhauer, Hohenfels (DE); Hans Dieter Tholl, Uhldingen (DE)

(73) Assignee: Bodenseewerk Gerätetechnik GmbH, Überlingen (DE)

( * ) Notice: Subject to any disclaimer, the term of this patent is extended or adjusted under 35 U.S.C. 154(b) by 800 days.

(21) Appl. No.: 10/870,857

(22) Filed: Jun. 17, 2004

(65) Prior Publication Data
US 2005/0018069 A1    Jan. 27, 2005

(30) Foreign Application Priority Data
Jul. 26, 2003    (DE)    ............... 103 34 185

(51) Int. Cl.
H04N 5/225    (2006.01)
H04N 9/04    (2006.01)
H04N 7/18    (2006.01)
H04N 9/47    (2006.01)

(52) U.S. Cl. .............. 348/207.99; 348/340; 348/143

(58) Field of Classification Search ............. 348/340, 348/344, 335, 348
See application file for complete search history.

(56) References Cited

U.S. PATENT DOCUMENTS

| | | | | |
|---|---|---|---|---|
| 2,430,595 A | * | 11/1947 | Young .................... | 396/21 |
| 4,012,126 A | * | 3/1977 | Rosendahl et al. ....... | 359/725 |
| 4,303,308 A | | 12/1981 | Kobrin | |
| 4,411,487 A | * | 10/1983 | Miller et al. ............ | 250/330 |
| 5,049,756 A | * | 9/1991 | Brown de Colstoun et al. ............. | 250/554 |
| 5,181,145 A | * | 1/1993 | Eden .................... | 359/859 |
| 5,627,675 A | * | 5/1997 | Davis et al. ............. | 359/725 |

(Continued)

FOREIGN PATENT DOCUMENTS

EP    1 178 352 A1    2/2002

(Continued)

OTHER PUBLICATIONS

Shree K. Nayar, "Omnidirectional Vision", *The Eighth International Symposium of Robotics Research*, Hayama Japan; Oct. 3-7, 1997.

*Primary Examiner*—David Ometz
*Assistant Examiner*—Wanda M Negron
(74) *Attorney, Agent, or Firm*—Scully, Scott, Murphy & Presser, P.C.

(57) ABSTRACT

A camera system (2, 40, 50) including a sensor (12, 58) and a first optical system which includes a convex mirror (4, 42) and through which the image of a solid angle region (14) is producible on the sensor (12, 58) by way of a first beam path (18). In order, in addition to producing an image of a large solid angle region (14), to permit scanning or detailed representation of a smaller partial region (20, 66, 82) of the solid angle region (14), the camera system (2, 40, 50) includes a second optical system through which a partial region (20, 66, 82) of the solid angle region (14) is detectable by way of a second beam path (34, 60) on a detail sensor (68), wherein the detail region (20, 66, 82) is selectable by an optical element (28) which is movable relative to the sensors (12, 58, 68).

8 Claims, 2 Drawing Sheets

U.S. PATENT DOCUMENTS

| | | | |
|---|---|---|---|
| 5,710,661 A * | 1/1998 | Cook | 359/364 |
| 5,842,054 A | 11/1998 | Suzuki et al. | |
| 6,157,018 A | 12/2000 | Ishiguro et al. | |
| 6,175,454 B1 * | 1/2001 | Hoogland et al. | 359/725 |
| 6,288,381 B1 * | 9/2001 | Messina | 250/201.1 |
| 6,341,044 B1 * | 1/2002 | Driscoll et al. | 359/725 |
| 6,347,010 B1 * | 2/2002 | Chen et al. | 359/402 |
| 6,493,032 B1 * | 12/2002 | Wallerstein et al. | 348/335 |
| 2002/0030163 A1 | 3/2002 | Zhang | |
| 2002/0145102 A1 * | 10/2002 | Eckelkamp-Baker et al. | 250/203.1 |
| 2003/0095338 A1 | 5/2003 | Singh et al. | |

FOREIGN PATENT DOCUMENTS

| | | |
|---|---|---|
| GB | 867251 | 5/1961 |
| WO | WO 02/08817 A2 | 1/2002 |

* cited by examiner

CAMERA SYSTEM FOR MONITORING A SOLID ANGLE REGION AND FOR DETECTION OF DETAILED INFORMATION FROM THE SOLID ANGLE REGION

BACKGROUND OF THE INVENTION

1. Field of the Invention

The invention concerns a camera system comprising a sensor and a first optical system which includes a convex mirror and through which the image of a solid angle region can be produced on the sensor by way of a first beam path.

2. Discussion of the Prior Art

For the purposes of monitoring large regions of space such as for example railway stations, airports, public places and squares, stadia and the like, camera systems are known which permit a view into a very large solid angle region—for example all around. The overview article 'Omnidirectional Vision', Proceedings of the Eighth International Symposium of Robotic Research, Hayama, Japan, Oct. 3-7, 1997, describes camera systems in which the beam path of an optical system is directed on to a convex mirror and in that way objects can be imaged on a sensor, from a very large solid angle region. In that case, the convex mirror used is in the form of a spherical mirror through which an all-around view can be achieved. It will be noted however that the large solid angle region which can be viewed gives rise to the disadvantage that objects which are far away from the convex mirror are only reproduced on the sensor in a small size and with little detail.

SUMMARY OF THE INVENTION

Therefore the object of the invention is to provide a camera system in which, in addition to a large viewable solid angle region, it is possible to detect detail information from the solid angle region.

That object is attained by a camera system of the kind set forth in the opening part of this specification, which includes a second optical system through which a partial region of the solid angle region can be detected by way of a second beam path on a detail sensor, wherein the detail region can be selected by an optical element which is movable relative to the sensors.

The invention is based on the consideration that detail information can be achieved in addition to a for example all-around view by a second camera system, whose field of view on to a partial region can be moved within the solid angle region covered by the first camera system. In this case the camera is directed on to the partial region which is of interest. Very precise pivotal movement of the detailed field of view on to the detailed partial region which is of interest is more easily possible if it is not the entire camera but only an optical element that has to be moved for pivotal direction on to the partial region which is of interest. In addition it is possible to save on components and costs, in comparison with two separate camera systems. In that way, in a camera system, the passive first optical system is supplemented by an active second optical system for detailed analysis of a partial region which is of particular interest.

The sensor can be designed for detecting visible or infrared light. A sensor which is active in the infrared frequency range can be in particular a micro-bolometer including a semiconductor device with a material whose electrical resistance decreases with an increase in temperature. The term convex mirror is used to denote all mirrors which are convexly curved at least in a Cartesian or polar co-ordinate direction, such as for example a ball which is mirrored on its outside surface, a cone or also a cone which is curved inwardly in the axial direction. It is also possible to consider other, for example hyperbolically shaped rotationally symmetrical mirrors.

Advantageously the camera system includes at least one optical element which is arranged in the first and the second beam path. It is possible to save on components, by virtue of such a common use of the optical element of the first and second optical systems. In addition, orientation of the partial region on to a zone which is selected out of the large solid angle region is facilitated as the use of the same optical element in the first and second beam paths means that the optical errors of the first and second optical systems can be matched to each other. It is possible in that way to produce wide first and detailed second images, the optical errors of which are matched to each other, which facilitates association of the images with each other.

In a further embodiment of the invention it is proposed that the sensor is designed for a first frequency range and the detail sensor is designed for a second frequency range which is different from the first one. It is possible in that way to obtain additional items of information which are not accessible in only one frequency range. Specified by way of example for such a configuration is a camera which, for monitoring an airport lounge, monitors a solid angle region extending all around, in the visible frequency range, in which case the partial region can be directed on to a specific person. The temperature of the person can be sensed by a detail sensor which is sensitive in the infrared spectral range, and it is thus possible to obtain information about the state of health of that person.

It is further proposed that the camera system includes a dichroic element for separating the first beam path from the second beam path. With such an element, the beam path of the second optical system can be coupled into and/or out of the first beam path, whereby subsequent optical elements can be used both as elements of the first optical system and also elements of the second optical system. A dichroic element affords different transmissiveness for radiations of differing frequencies and is for example transmissive for a radiation of a first frequency and reflects radiation of a second frequency. It is therefore possible to separate radiation of the first frequency range from radiation of the second frequency range. In an individual case the first frequency can lie in a narrow band within a wide frequency band of the second frequency.

In a further advantageous configuration of the invention the camera system includes a radiation source and an optical element for coupling radiation from the radiation source into the first beam path. In that way an object of interest in the solid angle region can be lit or can be scanned in a frequency range which is of interest, so that it is possible to obtain further additional information about that object. In addition the partial region can be directed on to the irradiated or scanned object so that the object can be viewed in detail. Coupling the radiation into the first beam path means that optical elements can be used both for deflecting the radiation emanating from the radiation source and also the radiation which is incident from the partial region and the solid angle region.

Desirably the camera system includes a distance measuring device, wherein the radiation source is a laser and the detail sensor is a photodiode. In that way, the distance of an object of interest can be ascertained by means of a suitable electronic control and evaluation arrangement.

A further advantage is achieved if the camera system includes a device for spectral analysis, the radiation source being a laser and the detail sensor being a spectrometer. In that way it is possible to implement spectral analysis of an object or gas in a partial region which is of interest. It is possible to detect smoke, poison, gas or generally poor air quality and initiate countermeasures. The term spectrometer is used to denote a sensor device with which incident radiation can be detected quantitatively in accordance with a plurality of discrete frequencies or frequencies in a continuous frequency band. Discrete frequencies can be detected for example with a sensor device having a plurality of photodetectors, for example photodiodes, which are sensitive in different frequencies. A continuous frequency band can be quantitatively represented in frequency-resolved manner by means of a tunable photodetector.

Desirably the laser is a multi-frequency laser, the frequency of which can be set in a predetermined range or which includes a plurality of different laser diodes. In that way spectral analysis can be directed to molecules or chemical elements which are of particular interest.

The good option of making common use of optical elements is achieved if the sensor is made in one piece with the detail sensor. It is additionally possible to save on components such as control devices, holding devices or cable arrangements.

It is further proposed that the camera system includes a second mirror arranged in the first beam path. That second mirror which co-operates with the convex mirror can be used for the compensation of optical errors in respect of the convex mirror. For example, a hyperbolic shape for the second mirror makes it possible to counteract an optical error of a convex mirror in the form of a sphere. The two-stage mirror arrangement comprising the convex mirror and the second mirror is desirably so designed that the first optical system has only one effective projection centre. That makes it possible in a simple manner to reconstruct by way of suitable transformation procedures from omnidirectional images, error-free panoramic images (by way of cylindrical projection) and perspective images (flat projection). The more effective projection centres the mirror arrangement involves and the further those projection centres are away from each other, the correspondingly more optical aberrations occur in the omnidirectional system.

Advantageously the convex mirror includes an opening through which the first beam path is passed. By virtue of that arrangement it is possible to use a dead space in which the sensor would otherwise form the image of itself. An optional arrangement of the sensor in the interior of the convex mirror can provide that it can be positioned stably and in a protected fashion.

Simple and precise beam deflection in the second beam path is achieved if the movable optical system includes a converging lens and a diverging lens which are displaceable relative to each other. The lenses can be microlenses or microoptical lenticular rasters.

DRAWING

BRIEF DESCRIPTION OF THE DRAWINGS

Further advantages will be apparent from the specific description hereinafter. The drawing illustrates an embodiment by way of example of the invention. The drawing, the description and the claims contain numerous features in combination. The man skilled in the art will desirably also consider the features individually and combine them together to provide appropriate further combinations. Similar elements illustrated in the Figures are denoted by the same references.

In the drawing.

DETAILED DESCRIPTION OF THE INVENTION

Figure 1:
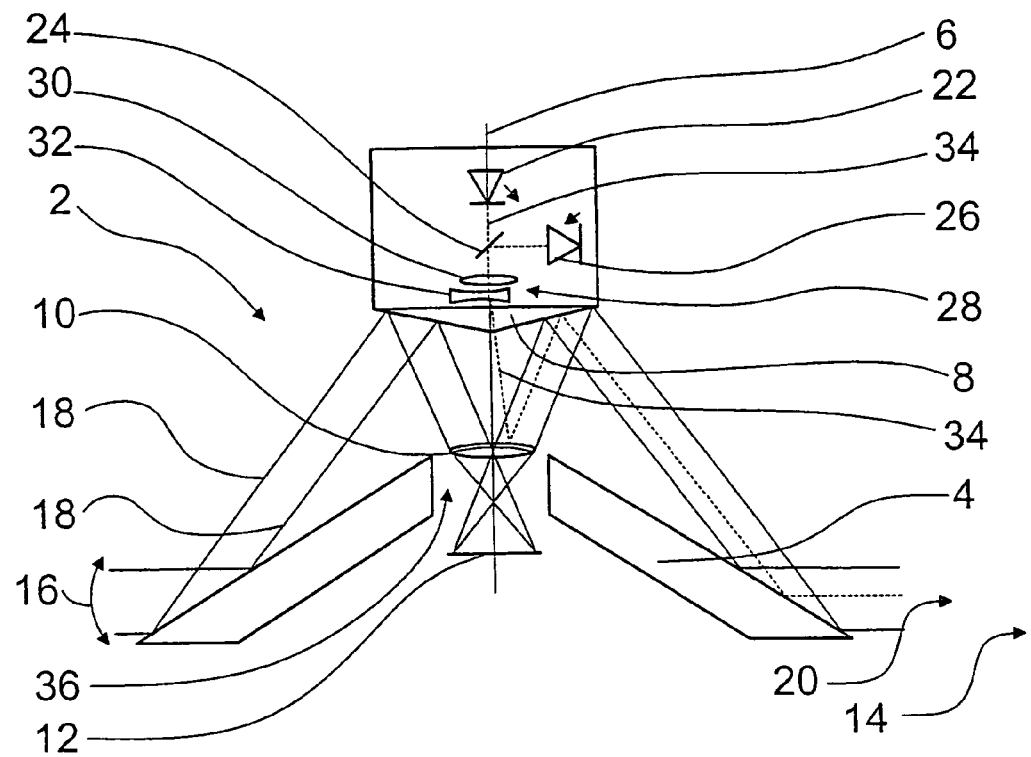
FIG. 1 shows a camera system with an omnidirectional field of view and a laser distance measuring device with an orientable laser beam.

FIG. 1 shows a camera system 2 with a first optical system for producing a panoramic view. A first optical system includes a convex mirror 4 which is in the form of an externally mirrored cone and which is arranged in rotationally symmetrical relationship about a longitudinal axis 6 of the camera system 2. The first optical system further includes a second mirror 8 which is also in the form of an externally mirrored cone and arranged in rotationally symmetrical relationship around the longitudinal axis 6. The mirror 8 and the convex mirror 4 are made from aluminium which is polished at its outside surface. It is also possible for the mirroring of the two mirrors 8, 4 to be produced by a thin silver or gold coating on a metal substrate. As a further optical element the first optical system includes a converging lens 10 for focusing an object, the image of which is to be formed, on a sensor 12. The sensor 12 is a matrix detector, also referred to as a focal plane array (FPA), which is in the form of a micro-bolometer which is sensitive in the infrared wavelength range.

It is possible to view through the first optical system of the camera system 2 a solid angle region 14 which extends around the longitudinal axis 6 with an aperture angle 16 of 50°, wherein the aperture angle 16 is oriented symmetrically around a notional plane perpendicularly to the longitudinal axis 6. A first beam path 18 extends in rotationally symmetrical relationship around the longitudinal axis 6 from the solid angle region 14 on to the convex mirror 4 and is passed from there to the mirror 8. The mirror 8 in turn passes radiation following the beam path 18 on to the converging lens 10, through which the radiation is focused along the beam path 18 towards the sensor 12. In that way the image of the solid angle region 14 or objects in the solid angle region 14 is formed on the sensor 12. Imaging is effected in the form of a circular image which is similar to the representation shown in FIG. 4 in the outer region. In that situation the region of the sensor 12 which is the inner region around the longitudinal axis 6 remains unused.

In addition to the first optical system the camera system 2 includes a second optical system through which a partial region or seament 20 of the solid angle region 14 can be scanned. The second optical system has a laser diode 22 which is designed to emit infrared laser light. Also part of the second optical system is a mirror 24 through which radiation coming from the laser diode 22 can pass but which reflects radiation directed towards the laser diode 22, towards a photodiode 26 used as a detail sensor. The photodiode 26 is sensitive in the same wavelength range as that in which the laser diode 22 emits radiation. The second optical system further includes a movable optical element 28 which is in the form of a microoptical scanner with a further converging lens 30 and a diverging lens 32. The diverging lens 32 is displaceable in any direction in space perpendicular to the longitudinal axis 6, relative to the further converging lens 30. Such displacement is produced by actuators (not shown) which are based on the mode of operation of the piezoelectric effect. The movable optical element 28 with its diverging lens 32 is thus arranged movably relative to the photodiode 26 and relative to the sensor 12.

The converging lens 10 which is dichroically mirrored on its surface which is directed upwardly in FIG. 1 is to be attributed both to the first and also the second optical system. That mirroring on the lens 10 reflects radiation within a narrow frequency band and allows radiation outside that frequency band to pass substantially unimpeded. The radiation emitted by the laser diode 22 is within that frequency band so that that laser radiation is reflected by the surface of the converging lens 10.

During operation of the camera system 2 laser radiation is emitted by the laser diode 22 in a second beam path 34 along the longitudinal axis 6 in the direction of the mirror 24. The radiation passes the mirror 24 substantially unimpeded and impinges on the movable optical element 28. In a position which is symmetrical about the longitudinal axis 6, both in respect of the converging lens 30 and also in respect of the diverging lens 32, the laser radiation is not deflected by the movable optical element 28. In the view in FIG. 1 it would pass vertically downwardly through the mirror 8 and impinge centrally on the converging lens 10. For alignment of the laser radiation emitted by the laser diode 22 on to a desired partial region 20, the diverging lens 32 is displaced a distance perpendicularly to the longitudinal axis 6. In FIG. 1 the diverging lens 32 is displaced by way of example towards the left. That causes the laser radiation to be deflected out of the longitudinal axis 6 so that it passes through the mirror 8 a distance to the right of the centre thereof. The converging lens 30 and the diverging lens 32, in the telescope arrangement thereof, form an afocal group, and can deflect the beam by virtue of relative displacement with respect to each other.

The laser radiation which follows the second beam path 34 impinges on the dichroic mirror layer of the converging lens 10 and is reflected back by same to the mirror 8 and in that way is coupled into the first beam path 18. The converging lens 10 thus also serves for coupling radiation from the laser diode 22 from the second beam path 34 into the first beam path 18. From reflection of the laser light by the dichroic layer, the second beam path 34 and the first beam path 18 extend in mutually identical relationship. The laser light is reflected by the mirror 8 in a direction towards the convex mirror 4 which in turn reflects the laser light into the selected partial region 20. The partial region 20 is disposed completely within the solid angle region 14 and—due to the strong focusing effect in respect of the laser light—involves only a small angular extent.

The convex mirror 4, the mirror 8 and the converging lens 10 are three optical elements which are arranged both in the first beam path 18 and also in the second beam path 34. They are to be attributed both to the first optical system and also to the second optical system.

In its region which is next to the longitudinal axis 6 the convex mirror 4 has an opening 36 through which the first beam path 18 is deflected and passed into the interior of the convex mirror 4. Also arranged in the interior of the convex mirror 4 is the sensor 12 which is fixedly connected to the convex mirror 4 by a holding device (not shown). That geometrical configuration of the camera system 2 means that the first beam path 8 can be kept symmetrical with respect to the longitudinal axis 6, which facilitates optically error-free imaging or at least imaging of good optical quality of objects from the solid angle region 14, on the sensor 12.

The laser diode 22 and the photodiode 26 are part of a device for distance measurement which can be operated in a manner known to the man skilled in the art. For that purpose the laser diode 22 emits pulsed laser radiation which impinges on an object disposed in the partial region 20 and is reflected thereby in the direction of the convex mirror 4. The reflected laser light is reflected by the convex mirror 4 on to the mirror 8 and from there on to the converging lens 10 whose dichroic layer projects the laser light on to the diverging lens 32 of the movable optical element 28. The converging lens 10 with its dichroic mirror surface thus serves as a dichroic element for separating the first beam path 18 from the second beam path 34. The movable optical element 28 couples the reflected laser radiation into the axis of symmetry, extending along the longitudinal axis 6, of the camera system 2, the laser radiation being reflected out of that axis by the mirror 24 again and being passed to the photodiode 26. The photodiode 26 detects the reflected laser light and passes voltage signals which are converted therefrom to an electronic evaluation arrangement which is not shown in FIG. 1. That electronic evaluation arrangement calculates the transit time of the pulsed laser light and calculates therefrom the distance of the object irradiated by the laser light in the partial region 20.

Figure 2:
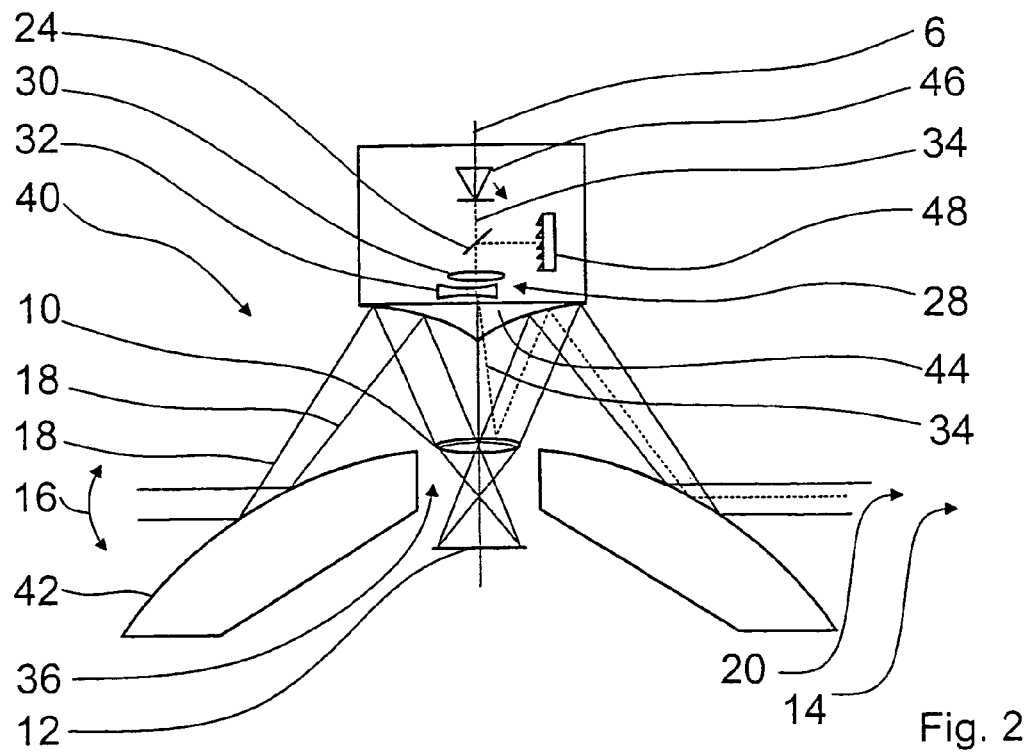
FIG. 2 shows a camera system with an omnidirectional field of view and a spectrometer.

FIG. 2 shows a camera system 40 which is quite similar to the camera system 2 shown in FIG. 1. Similar components of the camera systems 2 and 40 are denoted by the same references. The mode of operation of the camera system 40 substantially corresponds to that of the camera system 2, in which respect only the differences in the camera system 40 relative to the camera system 2 are discussed hereinafter.

The camera system 40 includes a convex mirror 42 which differs from the convex mirror 4 in that it is in the form of a portion of a sphere, and a mirror 44 which has a hyperboloidal outside surface. Both mirrors 42, 44 are arranged in rationally symmetrical relationship around the longitudinal axis 6 of the camera system 40 and can be referred to as convex mirrors. That two-stage mirror arrangement—just like the two-stage mirror arrangement in FIG. 1—is so designed that, together with the converging lens 10, it forms an optical system which is based on refraction and reflection and which has only one effective projection centre. In that way, it is possible to reconstruct by way of suitable mathematical transformation procedures from an omnidirectional image a panoramic or perspective image which is substantially free from optical errors.

A laser diode 46 of the camera system 40, the diode being operable in the infrared radiation range, is designed to be able to emit laser radiation in a plurality of frequencies (successively in time or at the same time). That radiation is deflected similarly to the situation described hereinbefore on to an object or a gas in the partial region 20, reflected from there and impinges on a spectrometer 48 provided for analysis of the reflected laser light. The laser diode 46 and the spectrometer 48 are connected to an electronic control and evaluation arrangement which is not shown in FIG. 2. By means of that electronic arrangement, it is possible to obtain information about the composition of the gas or object and the temperature thereof in the partial region 20. The mode of operation of a spectrometer 48 and the electronic arrangement for obtaining that information are familiar to the man skilled in the art and are therefore not further described hereinafter.

In contrast to the converging lens 10 shown in FIG. 1 the dichroic layer of the converging lens 10 in FIG. 2 reflects not just one but a plurality of narrow frequency bands which are all in the infrared spectral range. Outside those frequency bands the radiation can pass the dichroic layer substantially unimpeded. The radiation emitted by the laser diode 46 is within those frequency bands so that this laser radiation is reflected by the surface of the converging lens 10.

Figure 3:
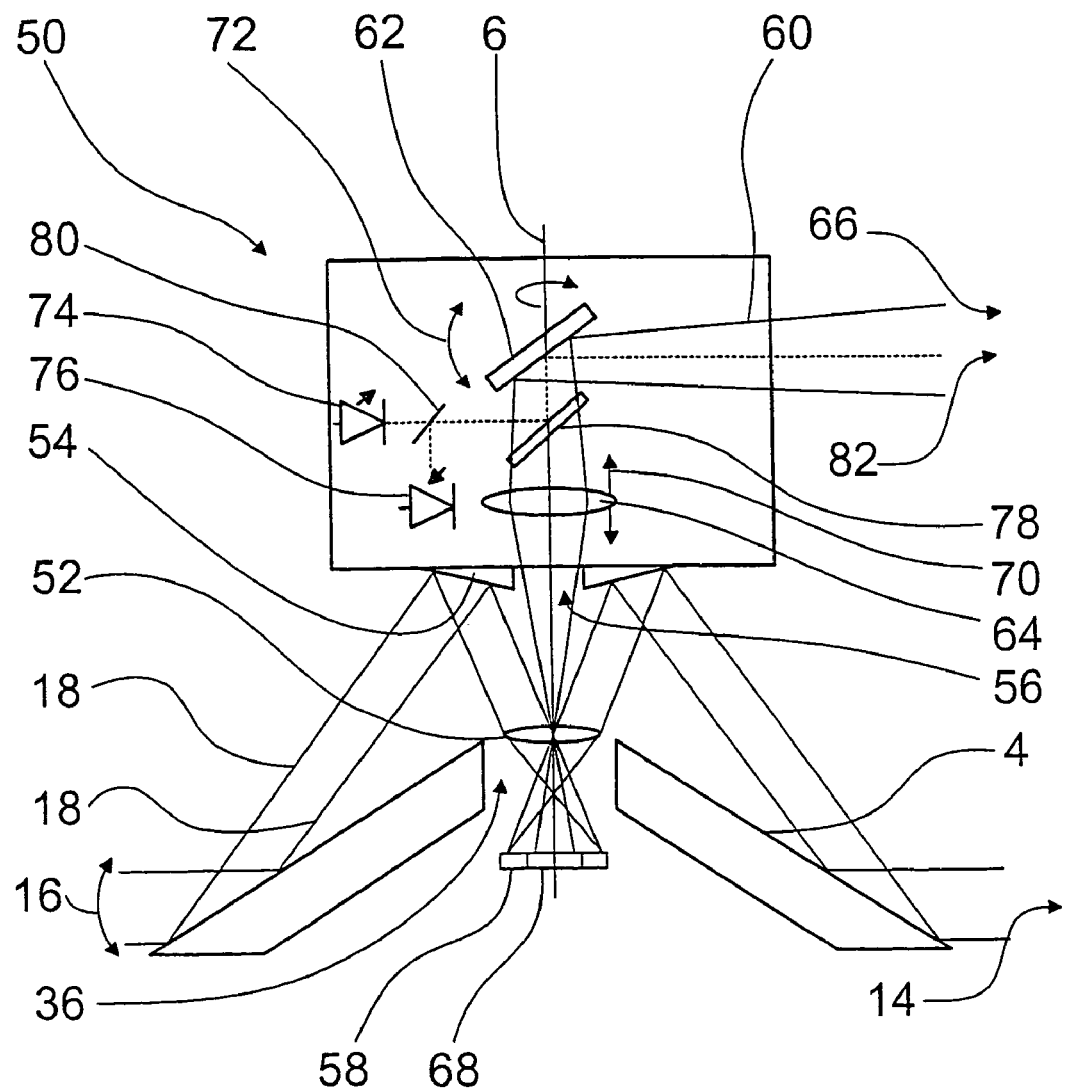
FIG. 3 shows a camera system with an omnidirectional field of view and an orientable and zoomable additional field of view.

A further embodiment of a camera system 50 according to the invention is shown in FIG. 3. Similarly to the camera system 2 shown in FIG. 1, the camera system 50 includes a frustoconical convex mirror 4 and a converging lens 52 which are arranged in rotationally symmetrical relationship around the longitudinal axis 6 of the camera system 50. The converging lens 52 however does not bear dichroic mirroring. Also arranged in rotationally symmetrical relationship around the longitudinal axis 6 is a second mirror 54 which has an opening 56 in its centre.

Figure 4:
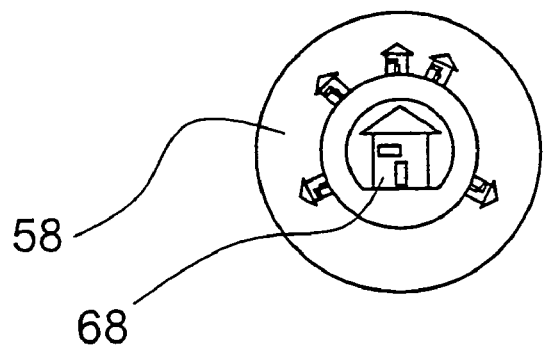
FIG. 4 shows imaging on a sensor and on an inwardly disposed detail sensor.

The first beam path 18 of the camera system 50 is of the same configuration as that of the camera system 2, whereby objects in the solid angle region 14 are imaged in an annular configuration on a sensor 58, as is shown in FIGS. 3 and 4.

A second optical system forming a second beam path 60 includes a movable mirror 62, a converging lens 64 and the converging lens 52 which also belongs to the first optical system. The image of an object arranged in a partial region 66 can be formed through the second optical system on a detail sensor 68, which is located within sensor 58. In this case, the second optical system is set up with its elements in such a way that the image of the object arranged in the partial region or segment 66 of solid angle region 14 is produced on the detail sensor 68 larger than through the first beam path 18 on the sensor 58. In that way the camera system 50 uses the dead zone of the convex mirror 4 and the second mirror 54 in order to represent a portion which is of interest on a larger scale on the detail sensor 68 within the omnidirectional image of the solid angle region 14 on the sensor 58, by means of the second optical system.

The converging lens 64 is movable along the longitudinal axis 6 of the camera system 50 in the direction of movement 70 indicated by arrows. In that way the second optical system has a zoom function, by which the image of the object disposed in the partial region 66 can be produced in a freely selectable size, within predetermined limits, on the detail sensor 68.

The detail sensor 68 and the sensor 58 are connected together integrally as one sensor. Alternatively, and without changes in the diagrammatic view in FIG. 3, the detail sensor 68 and the sensor 58 can also be sensitive in different frequency ranges and can be arranged separately from each other. Thus the sensor 58 can be designed for the visible range and the detail sensor 68 can be designed for the infrared range so that a panoramic view can be produced through the first optical system in the visible range and a detailed and zoomable detail image can be produced in the thermal radiation range through the second optical system. Once again, in the case of a camera system functioning as a motion sensor, without changes to the illustration in FIG. 3, the detail sensor 68 can be designed for the visible range and the sensor 58 for the infrared range. A heat source can thus be detected in a space to be monitored and a detailed checking image can be made available in the visible range to the monitoring personnel.

To select the partial region or segment 66 from the total solid angle region 14, the mirror 62 is not only rotatable through at least 360° about the longitudinal axis 6 of the camera system 50, but the mirror 62 is also pivotable as indicated by the arrow 72, as shown diagrammatically in FIG. 3.

The camera system 50 further includes a third optical system which in turn includes a laser diode 74, a photodiode 76, a coupling-out mirror 78 with a dichroic coating and a beam splitter 80. The laser diode 74 is operated at a frequency which is not in a frequency range in which the sensor 58 or the detail sensor 68 are sensitive. Similarly to the situation described with reference to FIG. 1, the third optical system serves with an electronic control and evaluation arrangement (not shown) as a distance measuring device. In this respect, the laser beam emitted by the laser diode 74 covers a partial region 82 which is a segment of and is smaller man than the partial region 66 associated with the second beam path 60.

REFERENCES 2 camera system
4 convex mirror
6 longitudinal axis
8 mirror
10 converging lens
12 sensor
14 solid angle region
16 aperture angle
18 beam path
20 partial region
22 laser diode
24 mirror
26 photodiode
28 optical element
30 converging lens
32 diverging lens
34 beam path
36 opening
40 camera system
42 convex mirror
44 mirror
46 laser diode
48 spectrometer
50 camera system
52 converging lens
54 mirror
56 opening
58 sensor
60 beam path
62 mirror
64 converging lens
66 partial region
68 detail sensor
70 direction of movement
72 arrow
74 laser diode
76 photodiode
78 coupling-out mirror
80 beam splitter
82 partial region

What is claimed is:

1. A camera system comprising a sensor, a first optical system which includes a convex mirror and through which the image of a solid angle region is producible on the sensor by way of a first beam path, a second optical system through which a partial region of the solid angle region is detectable by way of a second beam path on a detail sensor, wherein the partial region is selectable by an optical element which is movable relative to the sensors, a radiation source and an optical element for coupling radiation from the radiation source into the first beam path and including a device for spectral analysis, wherein the radiation source is a laser and the detail sensor is a spectrometer.

2. A camera system according to claim 1, wherein at least one optical element is arranged in the first beam path and in the second beam path.

3. A camera system according to claim 1, wherein the sensor is designed for a first frequency range and the detail sensor is designed for a second frequency range which is different from the first one.

4. A camera system according to claim 1, wherein there is provided a dichroic element for separating the first beam path from the second beam path.

5. A camera system according to claim 1, wherein the sensor is integral with the detail sensor.

6. A camera system according to claim 1, wherein a second mirror is arranged in the first beam path.

7. A camera system according to claim 1, wherein the convex mirror includes an opening through which the first beam path is passed.

8. A camera system according to claim 1, wherein the movable optical element includes a diverging lens and a converging lens which are displaceable relative to each other.

* * * * *